No. 670,039. Patented Mar. 19, 1901.
H. STANYON.
DRIVING MECHANISM FOR WIRE DRAWING OR ROD RIPPING BLOCKS.
(Application filed Mar. 13, 1899.)
(No Model.) 2 Sheets—Sheet 1.

Witnesses
Lindsay deB. Little
M. W. Caskey.

Inventor
Henry Stanyon,
by Wm L. Pierce,
His Attorney.

No. 670,039. Patented Mar. 19, 1901.
H. STANYON.
DRIVING MECHANISM FOR WIRE DRAWING OR ROD RIPPING BLOCKS.
(Application filed Mar. 13, 1899.)
(No Model.) 2 Sheets—Sheet 2.

Witnesses
Lindsay deB. Little
M. W. Caskey.

Inventor
Henry Stanyon,
by Wm L. Pierce,
his Attorney.

UNITED STATES PATENT OFFICE.

HENRY STANYON, OF BRADDOCK, PENNSYLVANIA.

DRIVING MECHANISM FOR WIRE-DRAWING OR ROD-RIPPING BLOCKS.

SPECIFICATION forming part of Letters Patent No. 670,039, dated March 19, 1901.

Application filed March 13, 1899. Serial No. 708,879. (No model.)

*To all whom it may concern:*

Be it known that I, HENRY STANYON, a citizen of the United States of America, and a resident of Braddock, county of Allegheny, and State of Pennsylvania, have invented certain new and useful Improvements in Wire-Drawing Blocks, of which the following is a specification.

Figures 1, 4:
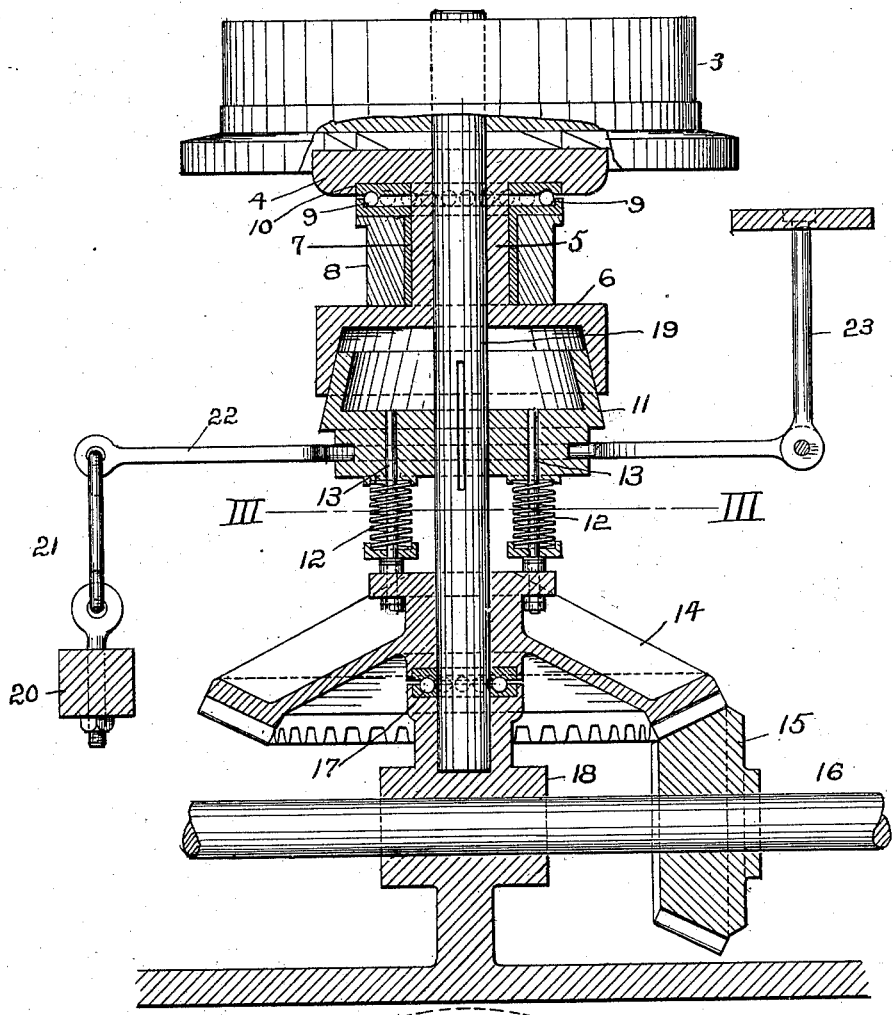
Figure 2:
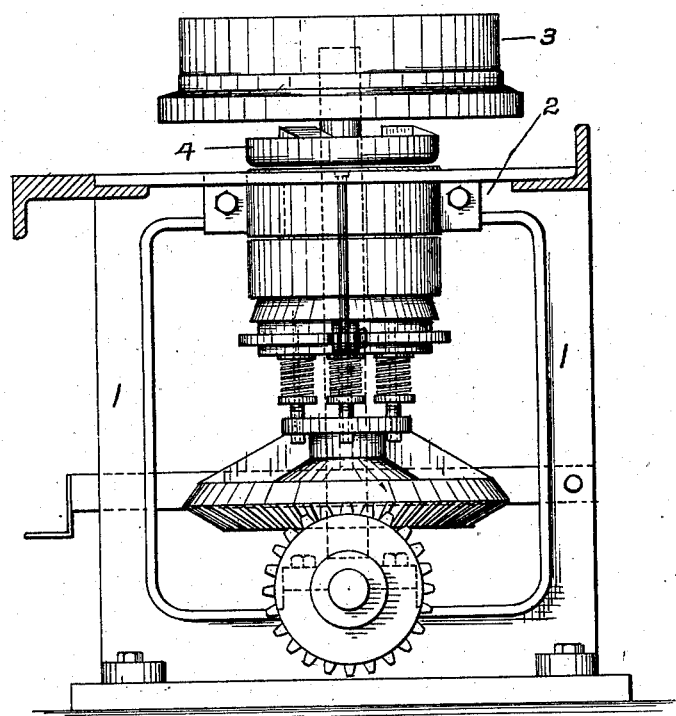
Figure 3:
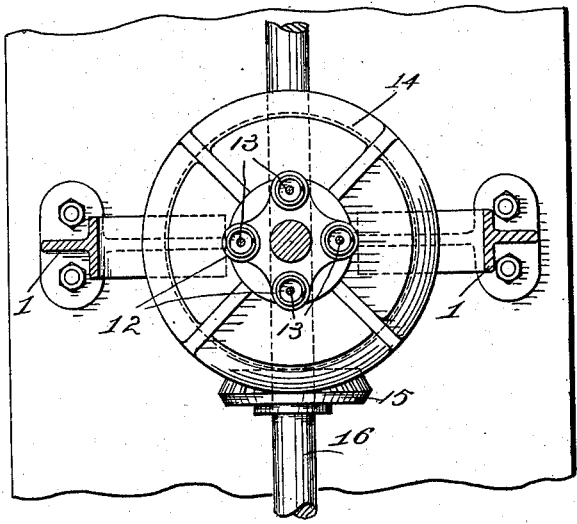

In the accompanying drawings, which make part of this specification, Figure 1 is a vertical section, partly in elevation, of the mechanism detached from the housings. Fig. 2 is a side elevation of the same in position in the housings. Fig. 3 is a section on line III III of Fig. 1. Fig. 4 is a plan view.

The purpose of my invention, generally stated, is to devise certain improvements in wire-drawing blocks, which are set out more specifically below as distinguished from the prior art. Briefly stated, these improvements relate to mechanism whereby the block is started by a friction-clutch instead of by a sudden impulse; also, the weight supported upon the driving gear-wheels is much lessened, so that their tendency to wear too deep is much decreased; also, a construction wherein the operator is not obliged to lift the block and the bundle of wire to stop the rotation of the block; also, a reduction in weight upon the lower end of the driving-spindle, avoiding excessive wear at this point; also, in certain other details of construction which produce better bearings and simpler mechanism and require less power in driving.

In the several views which appear in the drawings, 1 1 are the side members of the housings, and 2 the top member thereof.

3 is the wire-drawing block, which has upon its under side suitable lugs (not shown) to engage with the clutch 4.

5 is the clutch-bearing, and 6 the female member of a friction-clutch.

Clutch 4, bearing 5, and clutch member 6 are preferably made in a single casting.

7 is the steel ring between the clutch-bearing 5 and the housing-cap 8.

9 represents ball-bearings interposed between the steel ring 10, set in the clutch 4, and the steel ring 7.

11 is the male member of the friction-clutch, supported upon the springs 12 12, 13 13 being the spring-cores, which are seated in the upper side of the gear-wheel 14, driven by the pinion 15 from shaft 16. Gear-wheel 14 turns upon ball-bearings 17, supported upon the pedestal 18.

The spindle 19 is keyed to the male member 11 of the friction-clutch, and its lower end turns in a suitable socket in the pedestal 18. The upper end of spindle 19 passes loosely through the block 3.

20 is a treadle connected by link 21 to yoke 22, surrounding male member 11 of the friction-clutch, which yoke is pivoted to the hanger 23.

Operation: When it is desired to stop the block rotating, the treadle 20 is depressed and the male member of the friction-clutch pulled out of engagement with the female member and the block comes to rest as soon as the momentum is exhausted. When it is desired to start the block, the male member 11 is gradually raised into contact with the female member 6 by the controlled action of the springs 12 12 and the block starts up slowly instead of with a jump, as is the case where a positive clutch is employed, thus avoiding the snapping of the wire and strain upon the machinery.

The positive clutch 4 is merely to make a connection between the wire-drawing block 3 and the female member 6 of the friction-clutch. Clutch 4 obviously does not connect the wire-drawing block with the driving mechanism directly and immediately upon its engagement, but only after the male member of the friction-clutch is engaged with the female member 6.

In the old construction when the operator wished to stop the block he was obliged to lift the block with the bundle of wire, the block weighing about four hundred and eighty pounds and the bundle, if full, about one hundred and thirty-five pounds, in order to disengage the block from its clutch. By my mechanism all this heavy work is avoided, the only action being that the operator with his foot, through the medium of the treadle 23, lowers the member 11 of the clutch, disengaging it from the other member 6, which action compresses the springs 12. When it is desired to start the block, the treadle is released, when the springs 12 will force the member 11 of the clutch upward and into engagement with the member 6.

Another advantage in my construction is supporting the weight of the gear-wheel 14 and its burden and of the spindle 19 upon the ball-bearing 17 on the pedestal 18 instead of supporting this weight, as in the old construction, upon the spindle 19, which causes the gear and pinion and wheel to wear deeply and require frequent redressing. Again, the old construction, as heretofore explained, with the block must be lifted clear of its clutch at each stopping of the machine and dropped back again at each starting. This caused the clutch-lugs to wear round, which necessitated chipping the same. As my block is not required to be lifted off and on, this wear is avoided. Again, in the old construction the pull of the wire causes a lifting action on the spindle, having a tendency to pull the gears out of engagement. This was met by putting a collar on the spindle beneath the top member of the housing. This collar was made in two parts bolted together, which were exposed to wear and the usual disadvantages of such construction. I have escaped this construction, the upward thrust being met by the housing 8, acting against the upper side of the female member of the friction-clutch. I am also able to get by my construction a double size of the bearing 5, and consequently much less wear than by the old devices. Again, I have divided the weight of the parts by supporting the block and wire and the clutch in engagement with the block upon one set of bearings, while the driving-wheel and spindle are supported upon another set of bearings. In prior constructions the weight was all upon the end of the spindle, which caused excessive wear in the seat at the lower end of the spindle, requiring frequent repairs at this point.

In a machine consisting of as many parts as herein contained a great variety of simple mechanical changes may be made while still retaining the important features of my invention, and in the broad claims of this application I do not wish to be restricted by implication to specific mechanical details, but only to such features as are expressly enumerated in the claims.

It is possible to mount the block horizontally instead of vertically, as shown in the drawings; but such mounting I consider inferior to my construction.

By the expression "wire-drawing block" in the claims I intend to include blocks carrying rods as well as strictly wire.

Having described my invention, I claim—

1. The combination of a wire-drawing block and a clutch engaging with the same, both supported upon the same bearing; a spindle and a gear-wheel supported upon another bearing; and a friction-clutch to bring the two aforesaid sets of mechanism into operation.

2. The combination of a wire-drawing block; a clutch engaging the same; a bearing for said clutch; a female member of a friction-clutch; the first-mentioned clutch, bearing and female member being formed in one piece; a male member for the friction-clutch; and means for driving said male member.

3. The combination of a wire-drawing block; a clutch engaging the same; a bearing for said clutch; a female member of a friction-clutch connected to the first-mentioned clutch; a male member to said friction-clutch connected to a driving-gear; said driving-gear; springs to throw said male member into engagement with the female member; and a lever to compress the springs and throw the members of the friction-clutch out of engagement, said lever being connected to the periphery of the clutch.

4. The combination of a wire-drawing block; a clutch in engagement therewith; a spindle passing loosely through said block and clutch; a female member of a friction-clutch connected to said first-mentioned clutch; a male member to said friction-clutch attached to the spindle and a driving-gear connected with said male member.

5. The combination of a wire-drawing block and clutch in engagement therewith; ball-bearings supporting said clutch; a spindle; a driving gear-wheel; a male member of a friction-clutch secured to said spindle; ball-bearings supporting said spindle and driving-gear; and a female member of the friction-clutch connected with the clutch which directly engages the wire block.

6. The combination of a wire-drawing block and one clutch member, both supported on the same bearing; a spindle and a gear-wheel supported on another bearing; and a second clutch member to bring the two aforesaid sets of mechanism into operative relation with each other.

Signed by me at Pittsburg, Pennsylvania, this 9th day of March, A. D. 1899.

HENRY STANYON.

Witnesses:
WM. L. PIERCE,
L. D. IAMS.